(12) United States Patent
Lu et al.

(10) Patent No.: US 8,233,130 B2
(45) Date of Patent: Jul. 31, 2012

(54) DISPLAY PANEL AND FABRICATING METHOD THEREOF

(75) Inventors: Jhih-Ping Lu, Hsinchu County (TW); Yi-An Sha, Taipei (TW); Kuo-Tung Lin, Taipei County (TW); Chen-Chun Hsu, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 203 days.

(21) Appl. No.: 12/691,746

(22) Filed: Jan. 22, 2010

(65) Prior Publication Data

US 2010/0118253 A1 May 13, 2010

Related U.S. Application Data

(63) Continuation-in-part of application No. 11/140,949, filed on Jun. 1, 2005, now abandoned.

(30) Foreign Application Priority Data

Dec. 7, 2004 (TW) ................................. 93137856 A (51) Int. Cl.
*G02F 1/1339* (2006.01)
*G02F 1/1333* (2006.01)
(52) U.S. Cl. .......................................... 349/156; 349/86
(58) Field of Classification Search .................... 349/86, 349/157, 90, 89, 156
See application file for complete search history.

(56) References Cited

U.S. PATENT DOCUMENTS

2002/0171801 A1* 11/2002 Hsieh et al. .................... 349/187
2004/0169813 A1* 9/2004 Liang et al. .................... 349/187
* cited by examiner

*Primary Examiner* — Wen-Ying P Chen
(74) *Attorney, Agent, or Firm* — Jianq Chyun IP Office (57) ABSTRACT

A display panel including a substrate, a first electrode layer, a plurality of partition structures, a liquid display medium, a cap layer, a buffer layer and a second electrode layer is provided. The first electrode layer is disposed on the substrate. The partition structures are disposed on the first electrode layer, exposing a part of the first electrode layer. The liquid display medium is disposed on the first electrode layer between the partition structures. The cap layer is formed on the liquid display medium, and a buffer layer is formed on the cap layer. The second electrode layer is disposed on the buffer layer.

19 Claims, 8 Drawing Sheets

SAM/Buffer layer

FIG. 2A

SiO2/Buffer layer

FIG. 2B

Surfactant / Buffer layer

DISPLAY PANEL AND FABRICATING METHOD THEREOF

CROSS-REFERENCE TO RELATED APPLICATION

This application is a continuation-in-part of and claims the priority benefit of U.S. application Ser. No. 11/140,949, filed on Jun. 1, 2005, which claims the priority benefit of Taiwan application serial no. 93137856, filed on Dec. 7, 2004. The entirety of each of the above-mentioned patent applications is hereby incorporated by reference herein and made a part of this specification.

BACKGROUND OF THE INVENTION

1. Field of the Invention

The present invention relates to a display panel and a fabricating method thereof. More particularly, the present invention relates to a cholesteric liquid crystal display panel and a fabricating method thereof.

2. Description of Related Art

In recent years, flexible displays, electronic papers, and electronic books are being rapidly developed. The display media include liquid crystal displays, electrophoretic displays, electrochromic displays and electrolytic displays. In the application of electronic papers, compared with the displays constructed with other display materials, the display formed with a cholesteric liquid crystal material is brighter and has better contrast. In addition, the cholesteric liquid crystal display can be driven passively and produced easily.

In the past, in order to achieve a full-color cholesteric LCD, three layers of cholesteric liquid crystal capable of reflecting different colors are stacked, and a complicated driving manner is adopted, so that the display may produce reflection of different colors. One of the drawbacks of this method is that the alignment of the panel with the three-layer structure cannot be achieved easily. Further, this kind of display can only be bent slightly and the fabricating process is complicated.

Alternatively, a cholesteric structure with a single layer is used, in which in situ mixing techniques are applied in the manufacturing multi-color LCDs. According to this method, a photo-decomposing twist agent is printed at a predetermined position. Then, cholesteric liquid crystal is filled in and mixed with the twist agent. After that, UV light is irradiated to change (usually reduce) the amount of the twist agent in each area, such that the LCD can display multiple colors. However, the display quality of such an LCD tends to be affected by the UV light in the external environment. Hence, this type of device is unreliable.

Additionally, a display panel is typically constructed by stacking different material layers. The differences in the surface properties between the different material layers often affect the uniformity of these layers.

SUMMARY OF THE INVENTION

The present invention is directed to a method of fabricating a display panel, wherein the method includes forming a wetting-enhanced buffer layer. Hence, the surface property between the cap layer and the electrode layer is improved.

According to a method of fabricating a display panel of the invention, a first electrode layer is provided on a substrate. A plurality of partition structures is formed on the first electrode layer, wherein a portion of the first electrode layer is exposed. A liquid display medium is then formed on the first electrode layer between the partition structures, wherein the liquid display medium includes cholesteric liquid crystals. A cap layer is further formed on the liquid display medium. Thereafter, a buffer layer with wetting-enhanced and/or protective function is formed on the cap layer, followed by forming a second electrode layer on the buffer layer.

According to one aspect of the invention, the wetting-enhanced buffer layer is formed by forming a self-assembly membrane on the cap layer.

According to one aspect of the invention, the self-assembly membrane is formed by submerging the substrate with the cap layer thereon sequentially and repetitively in a polycation solution and a polyanion solution.

According to one aspect of the invention, the substrate is rinsed with deionized between polycation solution and the polyanion solution.

According to one aspect of the invention, the wetting-enhanced buffer layer is a silicon oxide layer formed by atmospheric pressure plasma.

According to one aspect of the invention, the wetting-enhanced buffer layer is formed by submerging the substrate with the cap layer thereon in a surfactant solution.

According to one aspect of the invention, the buffer layer is formed covering the top surfaces and sidewalls of the partition structures.

According to one aspect of the invention, the liquid crystal medium comprises color cholesteric liquid crystals formed by an inkjet printing process.

The present invention also provides a display panel, wherein a wetting-enhanced buffer layer is disposed between the cap layer and the electrode layer. Accordingly, the uniformity of the electrode layer is improved.

The present invention provides a display panel including a substrate, a first electrode layer, a plurality of partition structures, a liquid display medium, a cap layer, a buffer layer and a second electrode layer. The first electrode layer is disposed on the substrate. The plurality of partition structures is disposed on the first electrode layer, arranged in array so as to expose a part of the first electrode layer. The liquid display medium is disposed on the first electrode layer between the partition structures. The cap layer is configured on the liquid display medium, while the buffer layer is disposed on the cap layer. The second electrode layer is disposed on the buffer layer.

According to one aspect of the invention, the buffer layer includes a self-assembly membrane having at least a bilayer of a polyanionic polymer and a polycation polymer.

According to one aspect of the invention, the buffer layer includes a silicon oxide layer.

According to one aspect of the invention, the buffer layer includes a surfactant film.

According to one aspect of the invention, the buffer layer is configured to cover the top surfaces and sidewalls of the plurality of partition structures.

According to one aspect of the invention, the buffer layer is configured in between the plurality of partition structures.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

In the following description, reference is made to various exemplary embodiments in which the invention may be practiced, and it is to be understood that other embodiments may be employed without departing from the invention.

The First Embodiment

FIGS. 1A to 1C-1D and to 1C'-1D' are schematic cross-sectional views showing the fabricating processes of a display panel according to the first exemplary embodiment of the invention.

Figure 1A:
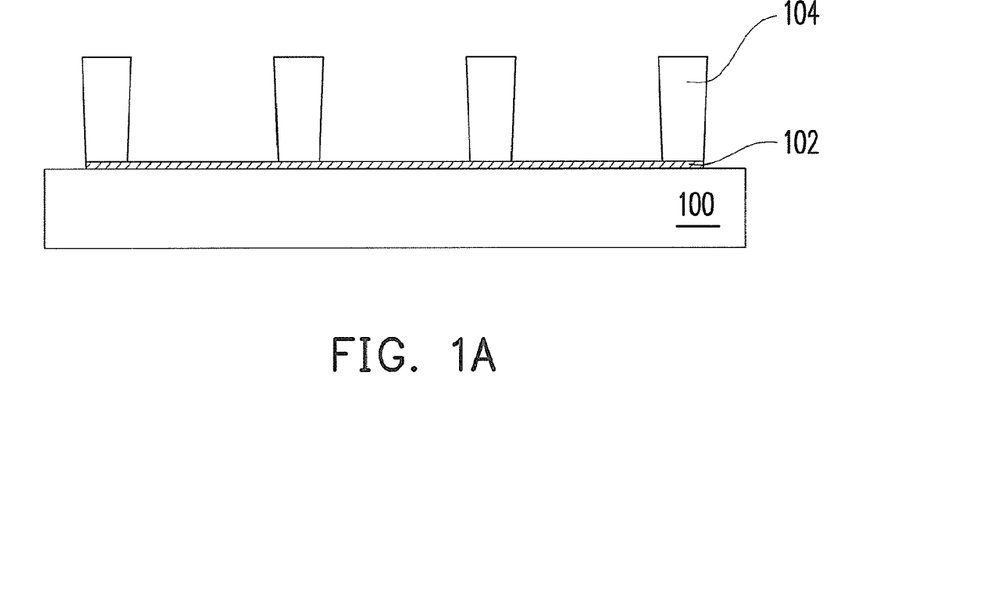
FIGS. 1A to 1C-1D and to 1C'-1D' are schematic cross-sectional views showing the fabricating processes of a display panel according to an embodiment of the present invention.

Referring to FIG. 1A, a substrate 100 is provided. The substrate 100 of the invention may be a flexible substrate, for example, a polymer plastic substrate. In an alternative embodiment, the substrate 100 may be a rigid substrate, for example, a glass substrate. A first electrode layer 102 is formed on the substrate 100. The first electrode layer 102 is formed with, for example, an inorganic transparent conductive material, such as, indium tin oxide (ITO) or indium zinc oxide (IZO). In another embodiment, the material of the first electrode layer 102 is an organic conductive material, such as poly(3,4-ethylene dioxythiophene)/poly(styrene sulfonate), (PEDOT/PSS).

Still referring to FIG. 1A, a plurality of partition structures 104 is formed on the first electrode layer 102. The plurality of partition structures 104 is arranged in an array such as a part of the first electrode layer 102 is exposed. The plurality of partition structures 104 is formed by, for example, photolithography and etching process, die-casting process, screen printing process, and/or ink-jet printing process. The material used in forming the partition structures includes, but not limited to, a melanin-containing polymer.

Figure 1B:
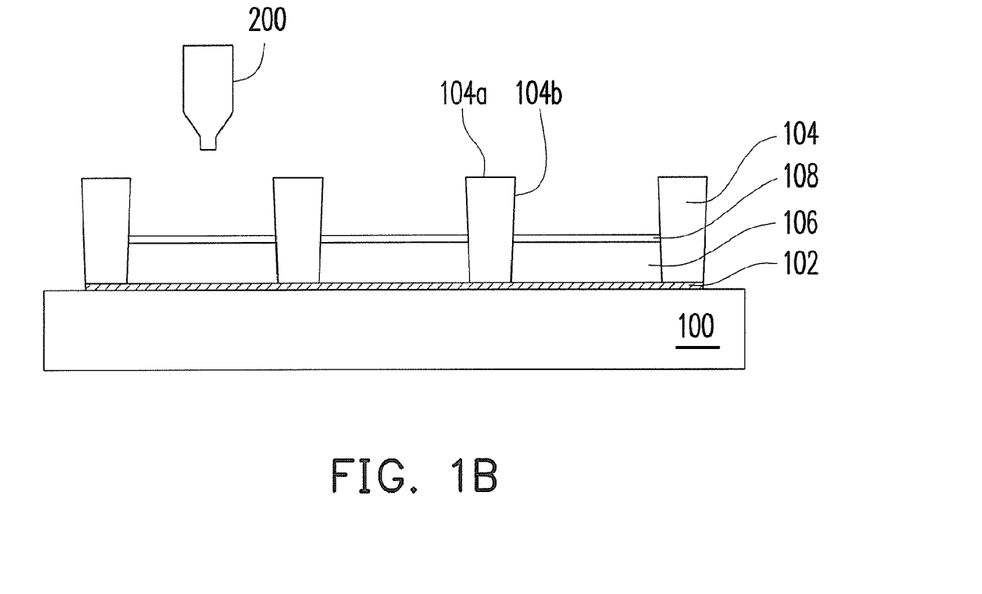

Referring to FIG. 1B, a liquid display material layer (not shown) is coated on the first electrode layer 102 between the partitioning structures 104 partially filling the gaps between the partition structures 104 to form a liquid display medium 106. In other words, the top surface 104a and the top part of the sidewall 104b of each partition structure 104 remain exposed after the coating of the liquid display material layer. In an embodiment of the invention, the coating process is achieved by printing the liquid display material layer on the first electrode layer 102 between the partitioning structures 104 through an inkjet printing process using an inkjet nozzle 200. Additionally, the liquid display material layer includes, for example, a solution of liquid crystalline materials and a polymer or precursor to the polymer, such as monomers or macromolecule prepolymers.

In one embodiment of the invention, the liquid display medium 106 includes, for example, different cholesteric liquid crystals, such that the light source after passing through the different cholesteric liquid crystals and being partially reflected will present three colors of red, green, and blue, for example. Further, the different cholesteric liquid crystals may be printed concurrently to form the liquid display medium 106. In another embodiment of the invention, the liquid display medium 106 includes a single kind of cholesteric liquid crystals, such that the light source after passing through the cholesteric liquid crystal and being partially reflected, presents a single color.

Still referring to FIG. 1B, a cap layer 108 is formed on the liquid display medium 106. The cap layer 108 is formed by, for example, a phase separation of the liquid display material layer (PIPS, Polymerization-Induced Phase Separation) induced by ultraviolet (UV) exposure, or heat, or evaporation of a solvent. Alternatively, the cap layer 108 may be formed by a deposition process.

Figure 1C:
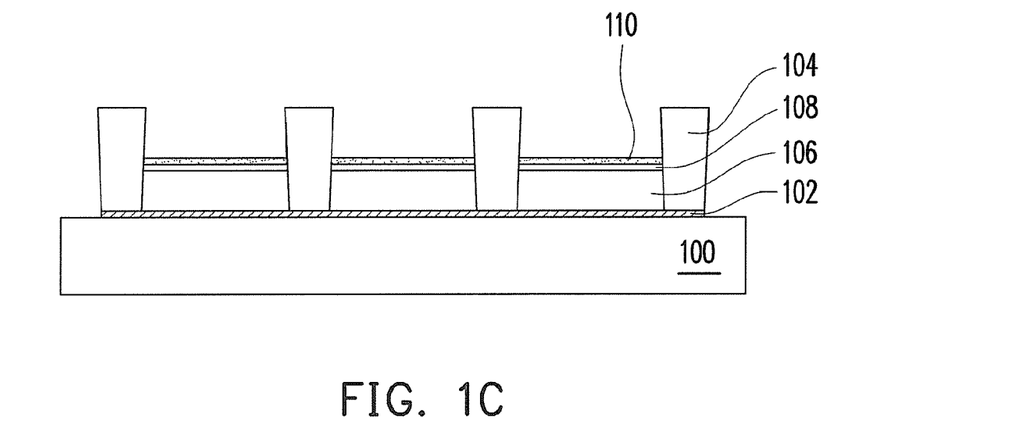

Continuing to FIGS. 1C and 1C', a buffer layer 110 is formed on the cap layer 108. In accordance to the invention, the buffer layer 110 at least serves to improve the wetting properties of the cap layer, and the surface tension between the cap layer 108 and the subsequently formed electrode layer. Typically, the hydrophobicity of the cap layer formed on the liquid crystal medium is greater than that of the electrode layer. Hence, during the formation of the electrode layer, a complete wetting does not occur, and beads of the electrode layer solution are formed. Ultimately, a non-uniform electrode layer is resulted. The formation of a wetting-enhanced buffer layer mitigates at least the above-mentioned problem, wherein the wetting-enhanced buffer layer is less hydrophobic or more hydrophilic than the underlying cap layer 108.

According to one exemplary embodiment of the invention, the buffer layer 110 is, for example, a self-assembly membrane (SAM) formed by the self-assembly monolayer technique. The formation of the self-assembly membrane is based on the electrostatic interaction between charged polymers. The growing of the film is achieved by a repetitive exposure of a surface to dilute polycation and polyanion solutions. The layer-by-layer assembly process ultimately provides a multilayer structure.

In one embodiment of the invention, the polyelectrolytes applicable in forming the buffer layer 110 of the invention includes, but not limited to, poly(acrylic acid) (PAA), poly (allylamine hydrochloride) (PAH), and poly(sodium 4-sytrene sulfonate) (PSS)/PAH. According to an aspect of the invention, the buffer layer 110 is formed by sequentially immersing the substrate 100, having the liquid crystal medium 106 and the cap layer 108 already constructed thereon, in a polycation solution, for example, a PAH solution and a polyanionic solution, for example, a PAA or PSS polyanionic solution. More specifically, the substrate 100 is immersed in the polyanionic solution, for about 10 to 15 minutes, for example, about 12 minutes, at room temperature, followed by rinsing the substrate 100 with deionized water. The substrate 100 is then immersed in the polycationic solution for about 10 to 15 minutes, for example, about 12 minutes, at room temperature, followed by rinsing the substrate 100 with deionized water. It should be appreciated by a person of ordinary skill practicing this invention that the order of the polyanionic solution and the polycationic solution for immersing the substrate 100 can be reversed. The rinsing with deionized water may be conducted for about 0 to 5 minutes.

The stepwise processes of immersing the substrate 100 in the polyelectrolyte solutions and rinsing with deionized are repeated until a desired film thickness is achieved. In one embodiment of the invention, the self-assembly membrane is grown to about 1 to 3 nm thick to form the buffer layer 110.

In another embodiment of the invention, the buffer layer 110 is a silicon oxide film formed by atmospheric pressure (AP) plasma, for example. AP plasma is generated in a pressure approximately matches the normal pressure of the surrounding by applying a high-energy electric field to decompose a neutral gas into a plasma state. Hence, subjecting liquid crystals to a vacuum state can be obviated. According to one embodiment of the invention, forming a $SiO_2$ buffer layer 110 on the cap layer 108 using AP plasma is accomplished by applying hexamethyldisilazane (HMDSN) as the monomer gas, clean dry air (CDA) as the main gas, argon as the carrier gas, wherein the flow rate of the main gas is maintained at about 40 SLM, while the flow rate of the carrier gas ranges from about 10 to about 80 sccm. Moreover, the processing gap height is set at about 20 mm and the processing velocity of the X-Y scrolling table on which the substrate 110 is placed is about 50 mm/s. It should be understood by one skilled in the art that in other exemplary embodiments, as the precursor of Si, tetraethoxysilane (TEOS), tetramethylcyclotetrasiloxane (TMCTS), tetramethyldisiloxane (TMDSO), hexamethyldisiloxane (HMDSO) may be used, and the carrier gas may include nitrogen or helium.

In yet another embodiment of the invention, the buffer layer 110 is a surfactant thin film, for example. A surfactant is made up of a water soluble (hydrophilic) component and a water insoluble (hydrophobic) component, wherein hydrophilic part of the surfactant is attracted to water molecules, while the hydrophobic part of the surfactant repels water and simultaneously attaches to an oil-based surface. In one exemplary embodiment of the invention, the substrate 100 having the cap layer 108 formed thereon is submerged) in a 1% surfactant solution, for example, TA0W-100 detergent (manufactured by Franklab S. A.) for about 10 minutes, followed by drying the substrate 100. Alternatively, the surfactant solution may be applied on the cap layer 108 using the ink-jet printing method. In essence, the cap layer 108 is rendered hydrophilic by chemisorbing a very thin film of surfactant on the surface. Hence, the wetting property of the cap layer for the subsequently formed second electrode layer is improved. It should be understood that the invention is not limited to a particular type of surfactant, and is applicable to any surfactants provided that they fall within the principles of the invention.

As shown in FIG. 1C, the buffer layer 110 is formed on the cap layer 108 between the partition structures 104, exposing the top surface 104a and the sidewall of each partition structure 104 according to one exemplary embodiment. Alternatively, as shown in FIG. 1C', the buffer layer 110 is formed as a conformal structure covering entirely the partition structures 104 and the cap layer 108. In other words, the buffer layer 110 also covers the top surfaces 104a and the sidewalls 104b of the partition structures 104.

Figure 1D:
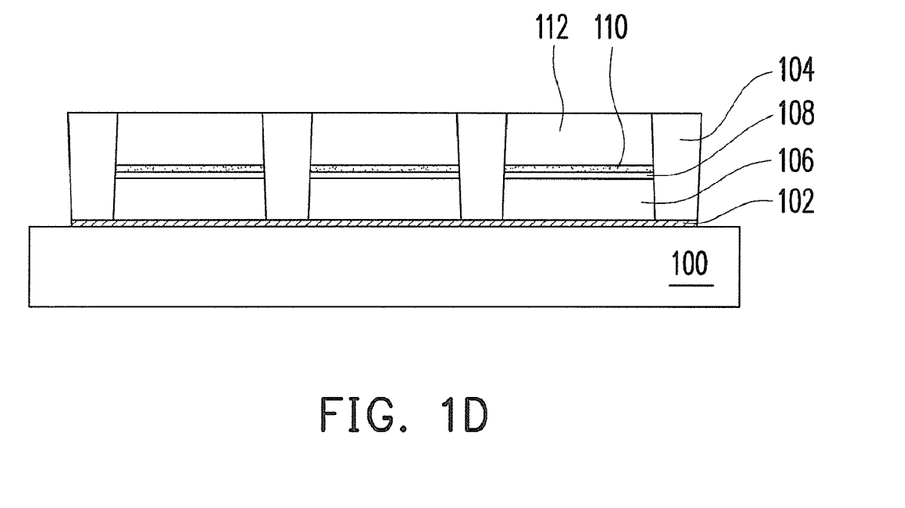

Referring to FIGS. 1D and 1D', a second electrode layer 112 is formed on the buffer layer 110. The second electrode layer 112 is formed via, for example, an inkjet printing process, screen printing process, a spin-coating process a printing process, a blade coating process, a screen printing process, a sputtering process and/or a deposition process, to coat a conductive material on the cap layer 108. The second electrode layer 112 is formed with, for example, poly(3,4-ethylene dioxythiophene) (PEDOT), poly(3,4-ethylene dioxythiophene)/poly(styrene sulfonate), (PEDOT/PSS), sputtered ITO or IZO.

Figure 2A:
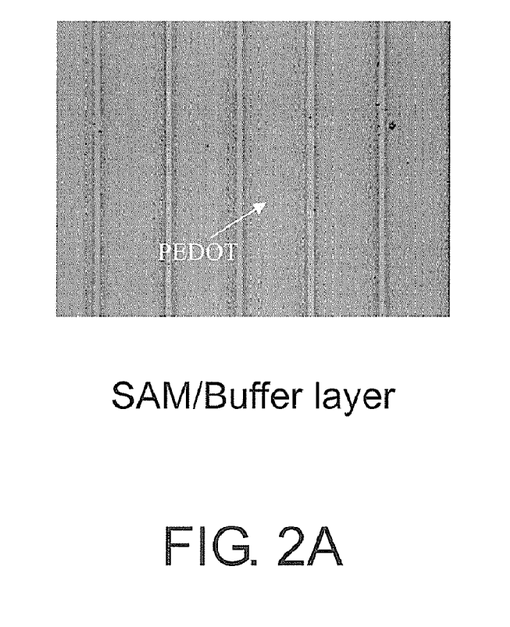
FIGS. 2A to 2D respectively illustrate the formation of a second electrode layer respectively on a SAM buffer layer, a silicon dioxide buffer layer 110, a surfactant based buffer layer and directly on a cap layer.
Figure 2B:
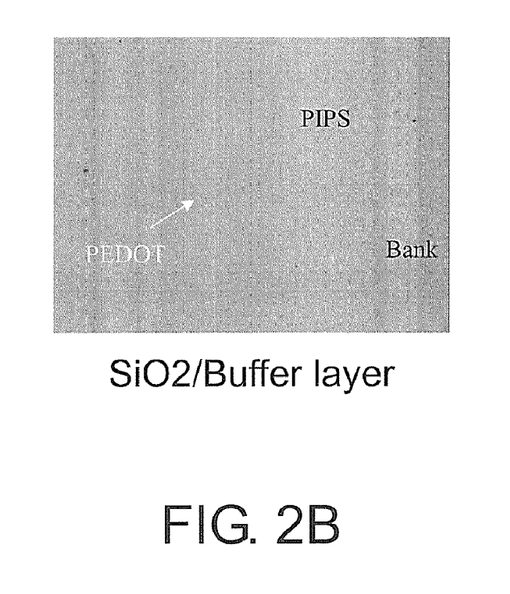
Figure 2C:
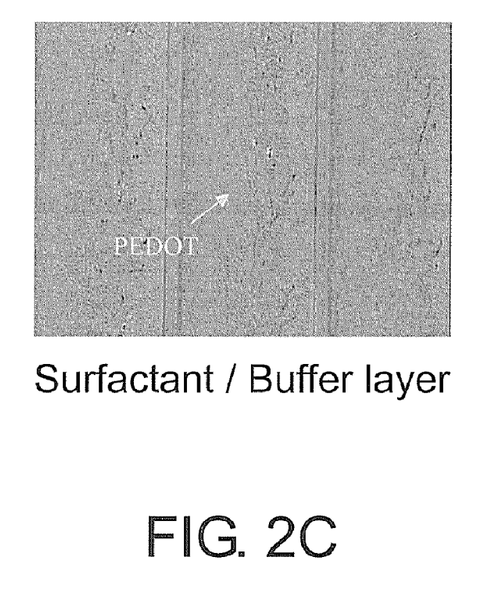
Figure 2D:
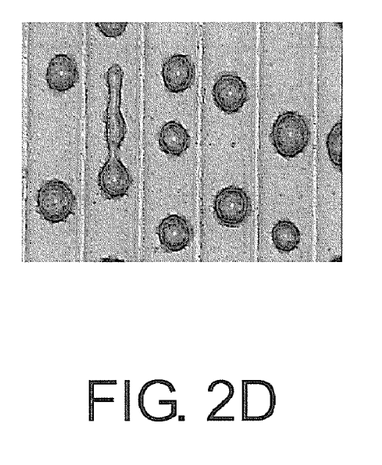

Referring to FIGS. 2A to 2D, FIGS. 2A to 2C illustrate the formation of the second electrode layer 112 respectively on a SAM buffer layer 110, a silicon dioxide buffer layer 110 and a surfactant based buffer layer 110. As shown in FIGS. 2A to 2C, the buffer layer 110 allows a more uniform spreading of the conductive electrode material, for example, PEDOT, used in forming the second electrode layer 112. On the contrary, as shown in FIG. 2D, the conductive electrode material, PEDOT, tends to bead up on the surface of the cap layer 108.

According to another embodiment of the present invention, the above fabricating method further includes forming an alignment layer (not shown) on the first electrode layer 102, such that the cholesteric liquid crystal would have the desired orientation. The material of the alignment layer includes, but not limited to, polyvinyl alcohol, polyimide, polyamide, nylon, silicon dioxide, or lecithin.

Figure 3A:
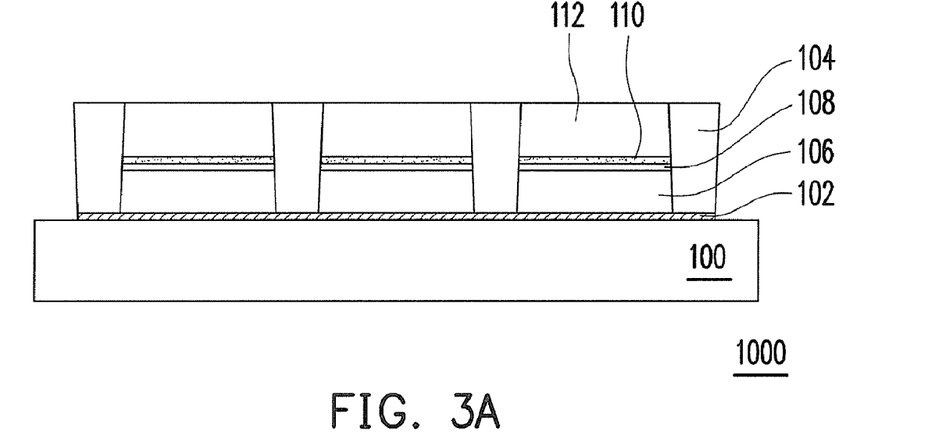
FIGS. 3A-3A' and 3B-3B' are different cross-sectional views of a display panel according to an embodiment of the present invention, wherein 3A and 3B correspond to the display panel illustrated in FIG. 1D, while FIGS. 3A' and 3B' correspond to the display panel illustrated in 1D'.
Figure 3B:
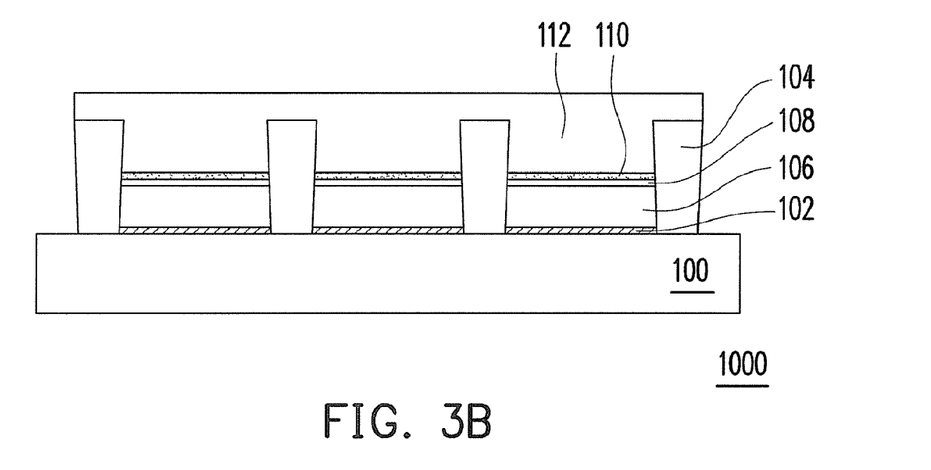

Referring to FIGS. 3A-3A' and 3B-3B', FIGS. 3As and 3Bs are different cross-sectional view of the display panel 1000 as disclosed above, wherein 3A and 3B correspond to the display panel illustrated in FIG. 1D, while FIGS. 3A' and 3B' correspond to the display panel illustrated in 1D'. The display panel 1000 of this exemplary embodiment includes a substrate 100, a first electrode layer 102, a plurality of partition structures 104, a liquid display medium 106, a cap layer 108, a buffer layer 110 and a second electrode layer 112. The first electrode layer 102 is disposed on the substrate 100. The plurality of partition structures 104 is disposed on the first electrode layer 102, exposing a part of the first electrode layer 102. The liquid display medium 106 is disposed on the first electrode layer 102 between the partition structures 104. The cap layer 108 is formed on the liquid display medium 106, and the buffer layer 110 is formed on the cap layer 108. The second electrode layer 112 is subsequently disposed on the buffer layer 110.

For the purpose of illustration, the disclosure above is exemplified with a passive display panel in which, the first electrode layer 102 of the display panel 1000 includes a plurality of parallel first stripe electrodes (not shown), and the second electrode layer 112 of the display panel 1000 includes a plurality of parallel second stripe electrodes (not shown), wherein the extending direction of the first stripe electrodes is substantially perpendicular to that of the second stripe electrodes. However, it should be understood the present invention is also applicable to an active display panel. In other words, the substrate 100 may comprise an active driver circuit thereon.

The Second Embodiment

Figure 4:
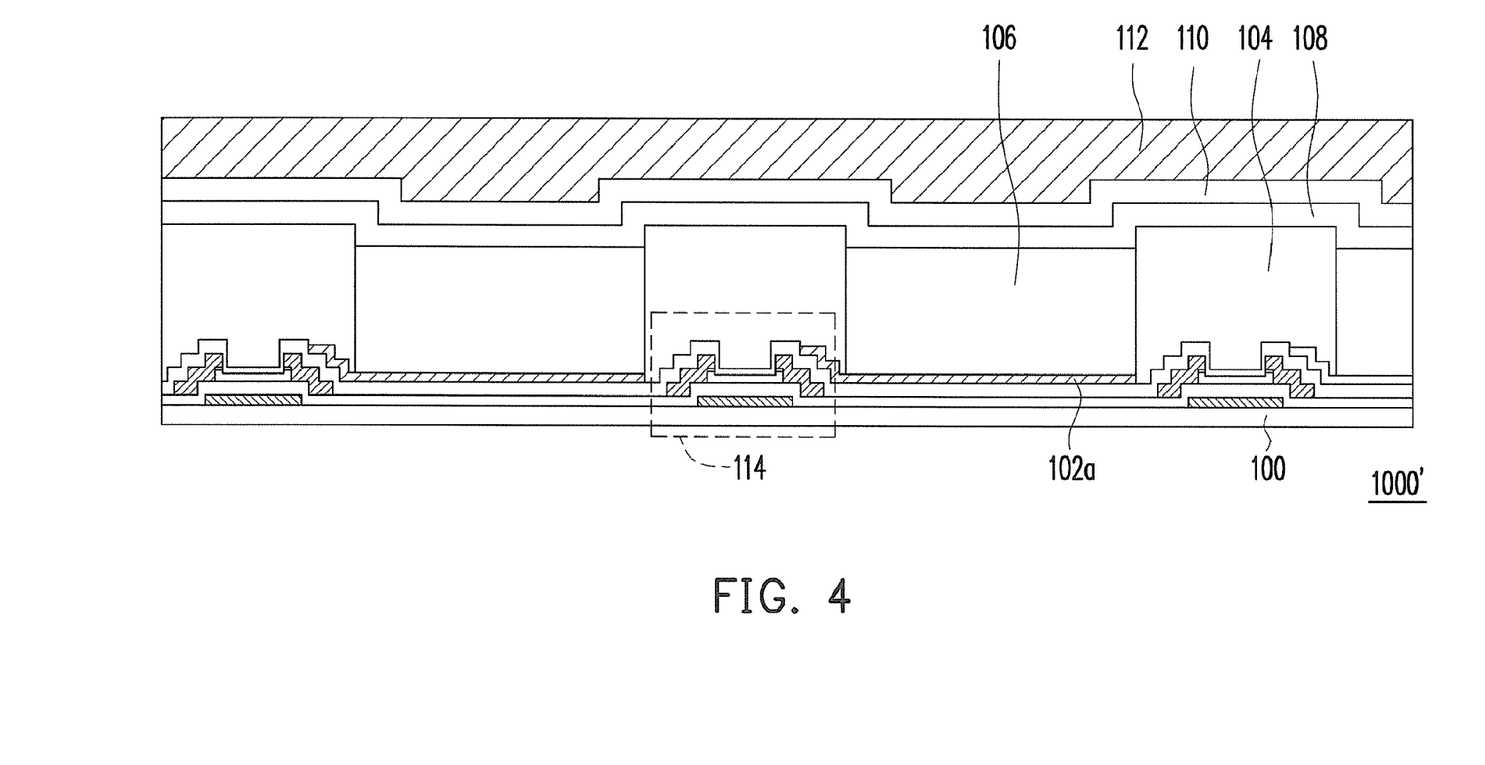
FIG. 4 is a schematic view of a display panel according to another embodiment of the present invention.

FIG. 4 is a schematic view of a display panel according to the second embodiment of the present invention. Referring to FIG. 4, the display panel 1000' of this embodiment further includes a plurality of active devices 114 arranged in array. The first electrode layer 102 of the display panel 1000' includes a plurality of pixel electrodes 102a electrically connected to the corresponding active devices 114, for example. The second electrode layer 112 of the display panel 1000' is a common electrode 110a, for example. In other words, the display panel 1000' is an active display panel. Further, the buffer layer 110 is configured between the second electrode layer 112 and the cap layer 108. The active devices 114 include a-Si TFTs, poly-Si TFTs, bipolar transistors, or other three-terminal active devices, for example.

It should be noted that although the active devices 114 shown in FIG. 4 are disposed below the partition structures 104, the active devices 114 may also be disposed on other positions. For example, the active devices 114 may be partially disposed below the partition structures 104 and partially disposed inside the pixels (i.e., below the liquid display medium 106), or the active devices 114 may also be completely disposed inside the pixels.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the appended claims and their equivalents.

What is claimed is:

1. A method of fabricating a display panel, comprising:
   providing a substrate;
   forming a first electrode layer on the substrate;
   forming a plurality of partition structures on the first electrode layer, exposing a portion of the first electrode layer;
   filling a liquid display medium in between the plurality of partition structures;
   forming a cap layer on the liquid display medium;
   forming a buffer layer on the cap layer, covering the liquid display medium and top surfaces and sidewalls of the plurality of partition structures; and
   forming a second electrode layer on the buffer layer.

2. The method of claim 1, wherein the buffer layer wetting-enhances or/and protects the cap layer.

3. The method of claim 1, wherein the step of forming the buffer layer comprises forming a self-assembly membrane.

4. The method of claim 3, wherein the step of forming the self-assembly membrane comprises sequentially submerging the substrate with the cap layer formed thereon in a polycation solution and a polyanion solution.

5. The method of claim 1, wherein the buffer layer comprises forming a silicon oxide film.

6. The method of claim 5, where the step of forming the silicon oxide film comprises performing atmospheric pressure plasma.

7. The method of claim 1, wherein the step of forming the buffer layer comprises forming a surfactant film on the cap layer.

8. The method of claim 1, wherein the liquid display medium comprises cholesteric liquid crystals.

9. The method of claim 1, wherein a method of filling the liquid display medium in between the plurality of partition structures comprises performing an inkjet printing process to coat different color cholesteric liquid crystals.

10. A display panel, comprising:
    a substrate;
    a first electrode layer, disposed on the substrate;
    a plurality of partition structures, disposed on the first electrode layer, wherein the pixel definition layer is arranged in array and exposes a part of the first electrode layer;
    a liquid display medium, disposed on the first electrode layer between the plurality of partition structures;
    a cap layer, disposed on the liquid display medium;
    a buffer layer, disposed on the cap layer and covering top surfaces and sidewalls of the plurality of partition structures; and
    a second electrode layer, disposed on the cap layer.

11. The display panel as claimed in claim 10, wherein the buffer layer wetting-enhances or/and protects the cap layer.

12. The display panel as claimed in claim 10, wherein the buffer layer comprises at least a bilayer of a polyanionic polymer and a polycationic polymer.

13. The display panel as claimed in claim 10, wherein the buffer layer comprises a silicon oxide film.

14. The display panel as claimed in claim 10, wherein the buffer layer comprises a surfactant film.

15. The display panel as claimed in claim 10, wherein the liquid display medium comprises cholesteric liquid crystals.

16. The display panel as claimed in claim 10, wherein the first electrode layer comprises a plurality of parallel first stripe electrodes, the second electrode layer comprises a plurality of parallel second stripe electrodes, and an extending direction of the first stripe electrodes is substantially perpendicular to that of the second stripe electrodes.

17. The display panel as claimed in claim 10, further comprising a plurality of active devices arranged in array, wherein the first electrode layer comprises a plurality of pixel electrodes, each of the pixel electrodes is electrically connected to one of the active devices correspondingly, and the second electrode layer comprises a common electrode.

18. A display panel, comprising:
    a substrate;
    a first electrode layer, disposed on the substrate;
    a plurality of partition structures, disposed on the first electrode layer, wherein the pixel definition layer is arranged in array and exposes a part of the first electrode layer;
    a liquid display medium, disposed on the first electrode layer between the plurality of partition structures;
    a cap layer, disposed on the liquid display medium;
    a buffer layer, disposed on and covering only the cap layer inbetween the plurality of partition structures; and
    a second electrode layer, disposed on the cap layer.

19. A method of fabricating a display panel, comprising:
    providing a substrate;
    forming a first electrode layer on the substrate;
    forming a plurality of partition structures on the first electrode layer, exposing a portion of the first electrode layer;
    filling a liquid display medium in between the plurality of partition structures;
    forming a cap layer on the liquid display medium;
    forming a buffer layer only on the cap layer inbetween the plurality of partition structures and covering the liquid display medium; and
    forming a second electrode layer on the buffer layer.

* * * * *